March 17, 1925.
J. E. COLLINS
1,530,108
COOLING AND PRECOOLING APPARATUS
Filed June 13, 1923   2 Sheets-Sheet 1
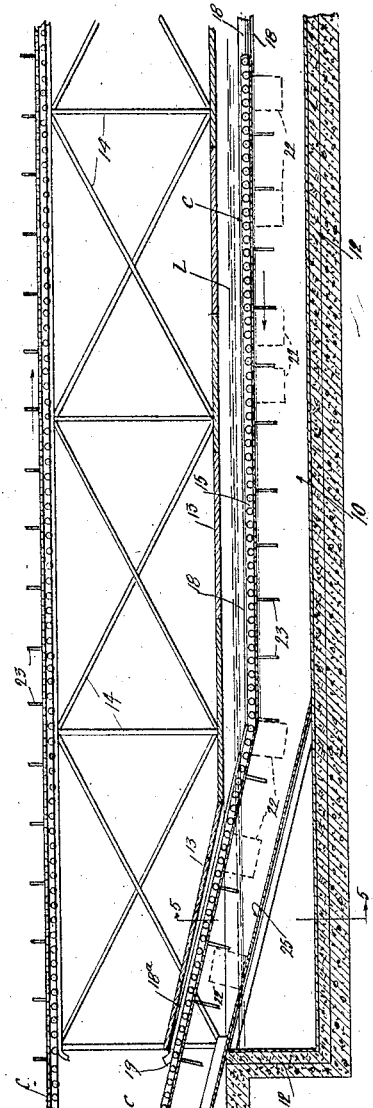
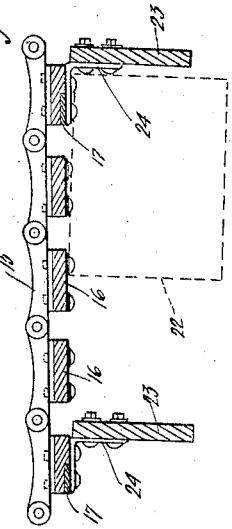
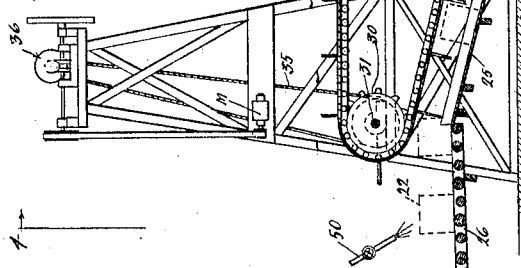
Inventor.
Joseph E. Collins
by
his Attorney.

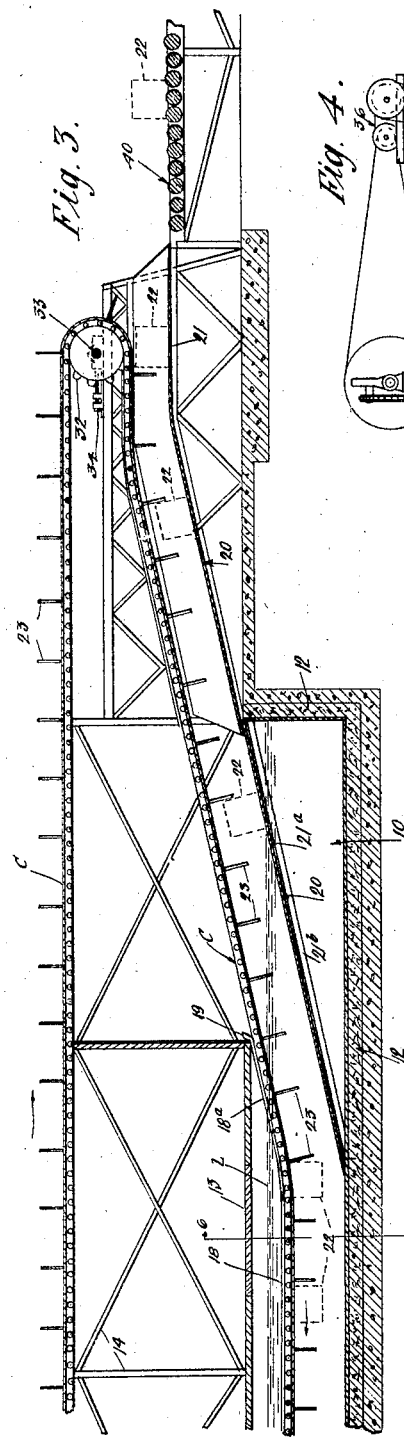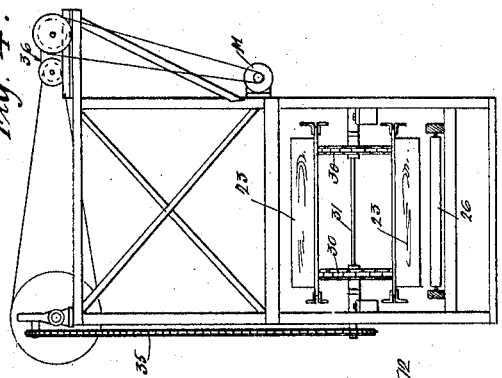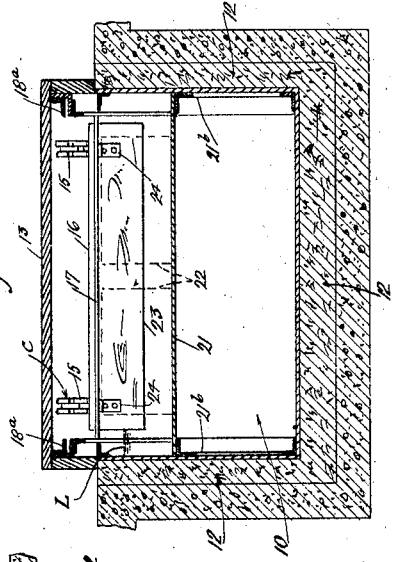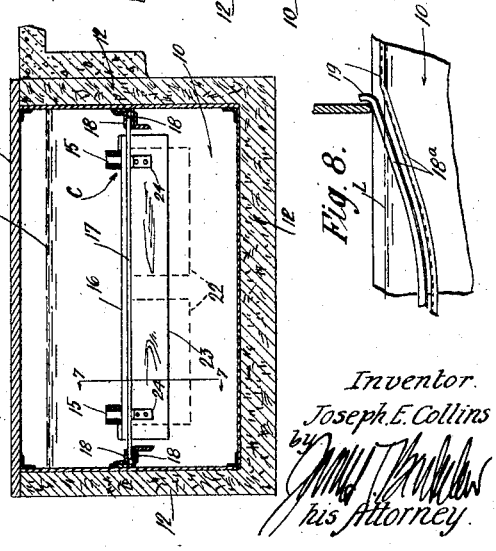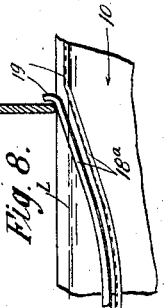

Patented Mar. 17, 1925.

1,530,108

UNITED STATES PATENT OFFICE.

JOSEPH E. COLLINS, OF RIVERSIDE, CALIFORNIA, ASSIGNOR TO THE IMPERIAL ICE & DEVELOPMENT COMPANY, OF RIVERSIDE, CALIFORNIA.

COOLING AND PRECOOLING APPARATUS.

Application filed June 13, 1923. Serial No. 645,216.

*To all whom it may concern:*

Be it known that I, JOSEPH E. COLLINS, a citizen of the United States, residing at Riverside, in the county of Riverside, State of California, have invented new and useful Improvements in Cooling and Precooling Apparatus, of which the following is a detailed specification.

This invention has to do with apparatus for cooling, precooling, chilling or refrigerating fruits, vegetables, or edibles of any character; or in fact, any articles that it may be desired to lower in temperature. The apparatus that forms the subject matter of this application and the corresponding process that forms the subject matter of a companion application filed on June 11th, 1923, entitled "Precooling process", Serial No. 644,708, are capable of cooling any article or body; and although they are peculiarly efficacious for the cooling of such things as cantaloupes and lettuce, because of the difficulties previously encountered in the effective cooling of such articles, and although the apparatus herein described has been developed specifically with such articles in view, it will be readily understood that the invention is not thereby limited.

Heretofore considerable difficulty has been experienced in cooling such vegetables and lettuce because the layers of air held between the leaves virtually insulate the interior parts of the lettuce against heat extraction. Difficulties in heat extraction have been experienced in the cooling of other vegetables and fruits. The present invention is aimed not only to overcome these difficulties but to increase the efficiency of cooling operations for all classes of articles. In preparing fruits and vegetables for shipment it is very desirable to precool them before placing in refrigerating cars; and the cost and time required to precool under the present known systems has become a very material item in the shipment of fruits and vegetables. A reduction in the cost and time of precooling is thus of substantial benefit to the grower and shipper. The time element is important of itself on account of the perishable nature of many articles.

I have found that the efficiency of cooling may be materially increased by immersing the fruit or vegetables in a cooling or refrigerating liquid, such as cold water; and I have devised ways and means for efficiently maintaining a body of cold water and for efficiently carrying the fruit or vegetables through the cold water, keeping them immersed for a sufficient time period to cool them throughout to the temperature desired. How I accomplish these operations will be best understood from the following detailed description wherein I described a typical and illustrative form of apparatus, referring for this purpose to the accompanying drawings in which:—

Fig. 1 is a diagrammatic plan; and

Fig. 1ª is a diagrammatic sectional elevation showing a typical general arrangement of our precooling apparatus;

Fig. 2 is an enlarged longitudinal central vertical section of one end of the apparatus; and Fig. 3 is a similar view of the other end of the apparatus;

Fig. 4 is an end elevation taken as indicated by line 4—4 on Fig. 2;

Fig. 5 is an enlarged cross-section on line 5—5 of Fig. 2;

Fig. 6 is an enlarged cross-section on line 6—6 of Fig. 3;

Fig. 7 is an enlarged sectional detail taken as indicated by line 7—7 of Fig. 6, and Fig. 8 is an enlarged detail of a part of the precooling tank.

In the drawings there is shown at 10 a suitable water tank which is of sufficient length that the articles to be cooled may remain immersed in the water for the requisite time period while traveling from end to end of the tank. The depth of the tank depends in general upon the size of the crates in which the fruit or vegetables are handled; and the width of the tank depends upon the size of the crates and also upon the number of lines of crates it is desired to put through the tank at one time. In the present instance I show a tank wide enough to take two lines of crates; but any number may be accommodated by proper design. This tank is supplied with cold water or other cooling liquid up to about the level indicated at L in the drawings; and in order to keep the water at a uniform low temperature it is circulated into and out of the tank from and to a water cooling tank or refrigerating apparatus, as indicated at 11 in Fig. 1, by a pump 11ª. Assuming that the travel of the crates through the tank is from right to left in Figs. 2 and 3, the cooled water from cooler 11 will be fed into the left hand end of the tank and the warmer water from the tank will be taken out at its right hand end, so that the conveyer movement is counter to the water flow, and the crate contents are subjected to the coldest water just before leaving the tank. The temperature of the water or other liquid in the tank may be regulated to produce any desired temperature in the fruit or vegetables as they leave the tank.

Tank 10 may be conveniently sunk in the concrete floor of the building and is preferably insulated at its bottom and sides as indicated at 12, and is covered over with insulating covers 13, the covering being preferably made in sections so as to be easily removable.

A chain conveyer C extends through the tank from end to end as shown in the drawings, its return course traveling over-head on a suitable frame structure 14. This chain conveyer is, in the specific form of device illustrated in the drawings, made up of two chains 15 connected by cross-slats 16. Certain of the cross-slats 16 have bars 17 that project out at the ends of the slats and slide between guides 18 mounted on the sides of the tank. These guides 18 extend horizontally, below the water level, through the major portions of the tank, but at the ends of the tank the guides rise on an incline as indicated at 18$^a$, so that the chain conveyer may be guided down into the tank on an incline and also be guided out of the tank on an incline. The entrance ends of these inclined guides are flared as shown in detail in Fig. 8 at 19, so that the chain conveyer may have easy entry to the guides. Where the chain conveyer comes down its inclined travel at the right hand or entry end of the tank, it travels above an inclined chute 20 that leads down from table 21 to a point at or near the bottom of the tank.

The inclined chute preferably comprises a metal sheet or plate 21 that leads down to the edge of the tank and there overlaps another sheet or plate 21$^a$ that leads on down to or near the bottom of the tank, plate 21$^a$ being supported on angles 21$^b$ secured to the sides of the tank. The crates 22 slide down chute 20 into the cooling liquid. The chain conveyer travels at a spaced distance over the inclined chute and over table 21, the space being sufficient to accommodate crates 22; and the crates are pushed along by transverse pusher boards 23 that are attached to certain of the cross-slats of the conveyer by angle brackets 24. It will be readily understood that the pusher boards may be attached to any desired slats, so that the pusher boards may be spaced apart any desired distance to accommodate crates of any size. Preferably the pusher boards and bars 17 are attached to the same slats, so that bars 17, riding in guides 18, will stabilize the pusher boards as much as possible.

The conveyer guides are also inclined upwardly at the discharge end of the tank as indicated at 18$^a$ in the drawings and the chain there travels up an incline above the inclined plane 25 on which crates 22 are pushed upwardly out of the tank. The structure of this inclined plane 25 is substantially the same as that of inclined chute 20 except that the metal sheet or plate is here in one piece. The crates are pushed off the upper end of inclined plane 25 onto a suitable conveyer 26, which may be a gravity roller conveyer or conveyers; and by these conveyers the crates are taken to packing tables where the operators remove the fruit or vegetables from the crates and pack them in shipping crates or boxes, usually icing them as they are packed. At the end of its upward inclined travel at the discharge end of the tank the conveyer C runs over sprockets 30 on a shaft 31; and from sprockets 30 the upper return course of conveyer C runs back to sprockets 32 at the head end of the tank, from whence the conveyer travels down its inclined travel as before described. Sprockets 32 are mounted on a shaft 33 whose bearings are mounted so as to be adjustable, as by an adjustment 34, to keep the conveyer tight.

Drive shaft 31 carrying the drive sprockets 30 is driven by chain 35 from a variable speed transmission gear 36 which is driven from motor M. In Figs. 2 and 4 I show an arrangement of these driving elements designed to save floor space; but it will be understood that any other suitable driving arrangement may be used.

Crates 22 are fed to table 21 by any suitable conveyers, as by gravity roller conveyers 40. These gravity roller conveyers 40 may be arranged to carry the crates past trimming tables where operators trim or otherwise prepare the fruit and vegetables and place them in the crates. The crates are then shoved along table 21 into proper position to be engaged by the pusher boards 23 on the conveyer C; and so the crates are carried down the inclined chute 20 and enter the cold water in tank 10. As soon as the crates are carried down into the water the buoyancy of the crates (constructed so as to be buoyant in themselves, as of wood) and the buoyancy of the fruit or vegetables, keeps the crates up against the conveyer; so that the crates are then "floated" through the water tank until they reach the incline 25 at the discharge end of the tank. The crates thus are not required to have frictional engagement with any guides or the like, and frictional losses are accordingly reduced to a minimum. The conveyer C is of course guided by its guides 18; and the conveyer may be, as a whole, of such specific gravity that it tends somewhat to sink in the water and therefore tends somewhat to bear against the lower guides. But the design may be so made that the upward lifting force of the crates and their contents exerted on the conveyer, due to the buoyancy of the crates and contents, is sufficient to greatly relieve the frictional pressure of the conveyer on the lower guides and to cause the conveyer more or less to float along between the guides without exerting any large pressure on either the lower or upper guides. By proper design and proportioning, the friction of travel of the conveyer may thus be very largely eliminated.

The speed at which the conveyer is operated, in a tank of any given length, will depend upon the time period required for cooling the crate contents to the desired temperature. Generally speaking, however, I have found that fruits and vegetables may be cooled much more quickly by this method of immersion than by any other known method of cooling.

After the crates have left the tank, the contents may be subjected to an air spray to dry them before packing. An arrangement for this purpose is diagrammatically illustrated at 50 in Fig. 2.

Having described a preferred form of my invention, I claim:—

1. Apparatus of the character described, comprising a tank adapted to hold a cooling liquid, a conveyer traveling from end to end of the tank, guides for the conveyer guiding it diagonally downwardly into one end of the tank and guiding it diagonally upwardly out of the other end of the tank, and inclined crate supporting chutes at the ends of the tank substantially parallel to and spaced below the inclined runs of the conveyer and extending at their upper ends above the liquid level in the tank.

2. Apparatus of the character described, comprising a tank adapted to hold a cooling liquid, a conveyer traveling from end to end of the tank, guides for the conveyer guiding it diagonally downwardly into one end of the tank and guiding it diagonally upwardly out of the other end of the tank, inclined crate supporting chutes at the ends of the tank substantially parallel to and spaced below the inclined runs of the conveyer: the run of the conveyer between the two opposite inclines in the tank being below the liquid level therein, crate engaging members on the lower face of the conveyer adapted to engage buoyant crates on the inclined chutes, and adapted to push such crates through the tank floating up against the conveyer.

3. Apparatus of the character described, comprising a tank adapted to hold a cooling liquid, a conveyer traveling from end to end of the tank, guides for the conveyer guiding it diagonally downwardly into one end of the tank and guiding it diagonally upwardly out of the other end of the tank, inclined crate supporting chutes at ends of the tank substantially parallel to and spaced below the inclined runs of the conveyer; the run of the conveyer between the two opposite inclines in the tank being below the liquid level therein, crate engaging members on the lower face of the conveyer adapted to engage crates on the inclined chutes, and means to operate the conveyer at varying speeds of travel.

4. Apparatus of the character described, comprising a tank adapted to hold a cooling liquid, guides in the tank extending diagonally downwardly into the tank at one end and then substantially horizontally under the liquid level to a point near the other end of the tank and then diagonally upwardly to the top of the tank, a conveyer traveling in said guides, and members on the lower face of the conveyer adapted to engage buoyant articles and move them through the tank.

5. Apparatus of the character described, comprising a tank adapted to hold a cooling liquid, guides in the tank extending diagonally downwardly into the tank at one end and then substantially horizontally under the liquid level to a point near the other end of the tank and then diagonally upwardly to the top of the tank, a conveyer traveling in said guides, and members on the lower face of the conveyer adapted to engage buoyant articles and move them through the tank; the tank having inclines at its ends on which the articles are moved down into and out of the tank.

6. Apparatus of the character described comprising a tank adapted to hold a cooling liquid, an inclined chute extending down into one end of the tank, and a table and a feeding conveyer at the upper end of the inclined chute; an inclined plane extending upwardly out of the other end of the tank; guides in the tank extending diagonally downwardly into the tank above the inclined chute and thus extending substantially horizontally under the liquid level to a point near and above the lower end of the inclined plane and thus extending diagonally upwardly to the upper edge of the tank, a conveyer traveling in said guides, and crate engaging members on the lower face of the conveyer adapted to engage buoyant crates and move them down the inclined chute, through the liquid in the tank, and up the inclined plane.

7. Apparatus of the character described comprising a tank adapted to hold a cooling liquid, an inclined chute extending down into one end of the tank, and a table and a feeding conveyer at the upper end of the inclined chute; an inclined plane extending upwardly out of the other end of the tank; guides in the tank extending diagonally downwardly into the tank above the inclined chute and thus extending substantially horizontally under the liquid level to a point near and above the lower end of the inclined plane and thus extending diagonally upwardly to the upper edge of the tank, a conveyer traveling in said guides, and crate engaging members on the lower face of the conveyer adapted to engage buoyant crates and move them down the inclined chute, through the liquid in the tank, and up the inclined plane; said conveyer embodying chains and cross slats, guide bars on some at least of the cross slats and extending beyond their ends to extend into the guides, and the crate engaging members being mounted on the same cross slats that have the guide bars.

8. In apparatus of the character described, a tank adapted to contain a cooling liquid, guides at opposite sides of the tank, and a conveyer adapted to move in said guides and comprising chains, cross-slats secured to said chains, guide bars mounted on some at least of said cross slats and projecting beyond their ends to enter the guides, and transverse pusher boards extending down from the lower face of the conveyer and mounted on the cross slats on which the guide bars are mounted.

In witness that I claim the foregoing I have hereunto subscribed my name this 24th day of May, 1923.

JOSEPH E. COLLINS.

Witnesses:
  C. W. LOTHROP,
  J. S. BARDWELL.